United States Patent
Sambasivan et al.

(10) Patent No.: US 7,991,580 B2
(45) Date of Patent: Aug. 2, 2011

(54) BENCHMARKING DIAGNOSTIC ALGORITHMS

(75) Inventors: Lokesh Sambasivan, Karnataka (IN); Joydeb Mukherjee, Karnataka (IN); Dinkar Mylaraswamy, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 650 days.

(21) Appl. No.: 12/104,039

(22) Filed: Apr. 16, 2008

(65) Prior Publication Data

US 2009/0265134 A1 Oct. 22, 2009

(51) Int. Cl.
*G06F 17/18* (2006.01)

(52) U.S. Cl. ...................................................... 702/179
(58) Field of Classification Search .................. 702/179
See application file for complete search history.

(56) References Cited

U.S. PATENT DOCUMENTS

| | | | |
|---|---|---|---|
| 4,970,725 A | 11/1990 | McEnroe et al. | |
| 5,130,936 A | 7/1992 | Sheppard et al. | |
| 5,544,308 A | 8/1996 | Giordano et al. | |
| 5,922,079 A * | 7/1999 | Booth et al. | 714/26 |
| 6,009,246 A | 12/1999 | Chandra et al. | |
| 6,167,352 A | 12/2000 | Kanevsky et al. | |
| 6,405,108 B1 | 6/2002 | Patel et al. | |
| 6,532,426 B1 | 3/2003 | Hooks et al. | |
| 6,591,182 B1 | 7/2003 | Cece et al. | |
| 6,591,226 B1 | 7/2003 | Hartmann et al. | |
| 6,765,593 B2 | 7/2004 | Simmons | |
| 7,031,878 B2 | 4/2006 | Cuddihy et al. | |
| 7,050,922 B1 | 5/2006 | Zhou | |
| 7,050,950 B2 * | 5/2006 | Goebel | 703/2 |
| 7,065,471 B2 | 6/2006 | Gotoh et al. | |
| 7,139,676 B2 | 11/2006 | Barford | |
| 7,177,785 B2 | 2/2007 | Hartmann et al. | |
| 7,209,814 B2 | 4/2007 | Kipersztok et al. | |
| 7,260,501 B2 | 8/2007 | Pattipatti et al. | |

* cited by examiner

*Primary Examiner* — Aditya Bhat
(74) *Attorney, Agent, or Firm* — Ingrassia Fisher & Lorenz

(57) ABSTRACT

A method for benchmarking diagnostic algorithms for a particular application is provided. The diagnostic algorithms are rank ordered based on a specified criterion so as to weed out weak algorithms, selecting more robust algorithms, defined in some sense, for deployment. This is realized by evaluating various parameters subsequently mentioned. A normalized product entropy ratio parameter is obtained. A performance parameter vector is fixed to define a plurality of sensitivity parameters including a plurality of threshold parameters and a plurality of data parameters. The plurality of threshold parameters and the plurality of data parameters are perturbed to obtain a threshold sensitivity parameter and a data sensitivity parameter.

18 Claims, 4 Drawing Sheets

| CLASSIFIER | PMC | NPER | THRESHOLD SENSITIVITY | DATA SENSITIVITY |
|---|---|---|---|---|
| MLCG | 20.6890 | 0.8220 | 0.0000 | 2.2160 |
| LPCA | 20.8540 | 0.8310 | 2.8350 | 1.5050 |
| NPBC-3 | 17.0900 | 0.7970 | 2.1870 | 4.5050 |
| SVM-G | 16.9950 | 0.8210 | 1.3950 | 4.1770 |
| k-NN-3 | 12.4120 | 0.9530 | 0.0000 | 12.6380 |
| k-NN-5 | 13.1130 | 0.9330 | 0.0000 | 6.5750 |

FIG. 3

| CLASSIFIER | PMC | NPER | THRESHOLD SENSITIVITY | DATA SENSITIVITY |
|---|---|---|---|---|
| MLCG | 5.8200 | 0.9570 | 0.0000 | 12.6970 |
| LPCA | 13.4420 | 0.3000 | 22.7480 | 7.4800 |
| NPBC-5 | 2.9100 | 0.8000 | 6.1980 | 64.8580 |
| k-NN-3 | 2.3780 | 0.9970 | 0.0000 | 30.5650 |
| k-NN-10 | 2.4670 | 0.7570 | 1.0000 | 25.3840 |

BENCHMARKING DIAGNOSTIC ALGORITHMS

FIELD OF THE INVENTION

The present invention generally relates to fault diagnosis, and more particularly, but not exclusively, to a method, system, and computer program product for benchmarking diagnostic algorithms, rank ordering the algorithms with respect to a pre-specified criterion.

BACKGROUND OF THE INVENTION

A fault refers to an abnormal state of a machine or a system, including dysfunction or malfunction of a part, an assembly, or the whole system. The occurrence of a fault is associated with a number of factors, which in turn is related to a number of symptoms. Fault diagnostics or fault diagnosis is the study of the relationship of fault, factors and symptoms. Fault diagnosis may be used to predict and control the performance of a system, such as a telecommunication system, semiconductor manufacturing equipment, or a human body.

A variety of methods may be used for fault diagnosis. They include such methods as time series analysis, fuzzy logic methods, neural networks, case-based reasoning, probability reasoning, and a combination of the above methods. Diagnostic algorithms representative of the above approaches are derived and utilized in various applications for fault diagnosis.

Fault diagnosis has gained considerable significance, for example, in a cost conscious aerospace industry. A particular diagnostic algorithm for an aircraft must prove itself to be advantageous from a cost-benefit standpoint. As a result, personnel such as engineers are faced with an often difficult problem of choosing a best diagnostic algorithm from among many candidate diagnostic algorithms. Despite the appeal of multiple algorithm solutions, practical applications are limited by engineering resources. The engineer is forced to pick a few among many.

Accordingly, it is desirable to implement a system, method, and computer program product by which a variety of diagnostic algorithms may be benchmarked against each other, whereby a best diagnostic algorithm for a particular application may be selected. In selecting a best diagnostic algorithm, it is desirable to implement a mechanism whereby non-robust algorithms that do not generalize well on unseen data or scenarios may be weeded out. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In one embodiment, by way of example only, a method for benchmarking diagnostic algorithms for a particular application is provided. A normalized product entropy ratio parameter is obtained. A performance parameter vector is fixed to define a plurality of sensitivity parameters including a plurality of threshold parameters and a plurality of data parameters. The plurality of threshold parameters and the plurality of data parameters are perturbed to obtain a threshold sensitivity parameter and a data sensitivity parameter.

In another embodiment, again by way of example only, a computer system for benchmarking diagnostic algorithms for a particular application is provided. A storage device stores and retrieves the dataset. A processor is coupled to the storage device. The processor is configured for obtaining a normalized product entropy ratio parameter, fixing a performance parameter vector to define a plurality of sensitivity parameters including a plurality of threshold parameters and a plurality of data parameters, and perturbing the plurality of threshold parameters and the plurality of data parameters to obtain a threshold sensitivity parameter and a data sensitivity parameter.

In still another embodiment, again by way of example only, a computer program product for benchmarking diagnostic algorithms for a particular application is provided. The computer program product comprises a computer-readable storage medium having computer-readable program code portions stored therein. The computer-readable program code portions comprise a first executable portion configured for obtaining a normalized product entropy ratio parameter, a second executable portion configured for fixing a performance parameter vector to define a plurality of sensitivity parameters including a plurality of threshold parameters and a plurality of data parameters, and a third executable portion configured for perturbing the plurality of threshold parameters and the plurality of data parameters to obtain a threshold sensitivity parameter and a data sensitivity parameter.

BRIEF DESCRIPTION OF THE DRAWINGS

The present invention will hereinafter be described in conjunction with the following drawing figures, wherein like numerals denote like elements.

FIG. 3 illustrates exemplary performance parameters and sensitivity parameters for a vowel dataset with various classifiers;

FIG. 4 illustrates exemplary performance parameters and sensitivity parameters for a gas turbine engine dataset with various classifiers.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
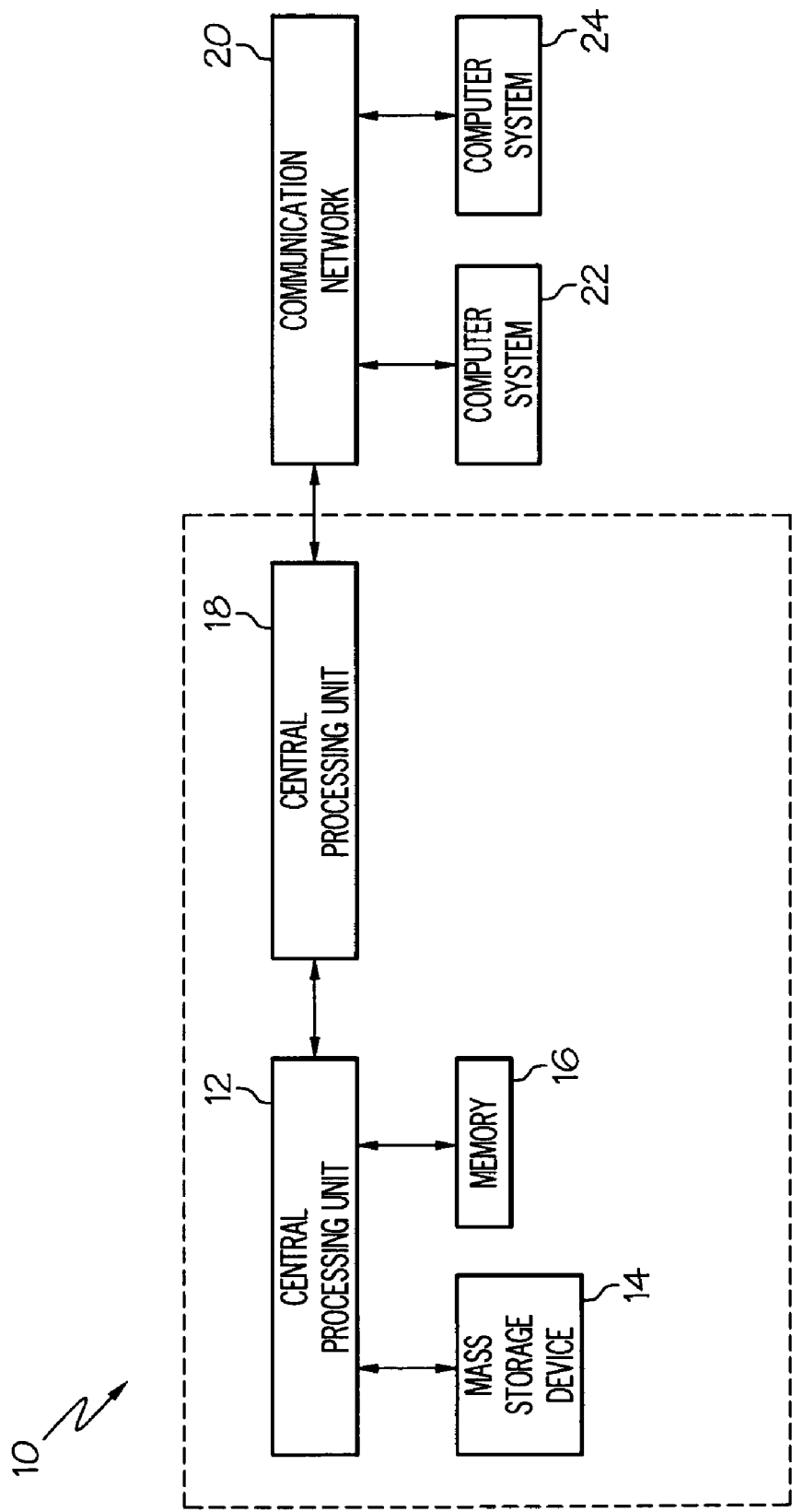
FIG. 1 is a block diagram of an exemplary computer system capable of implementing and/or incorporating one or more aspects of the following description and claimed subject matter.

Turning to FIG. 1, an exemplary computing environment 10 is depicted capable of incorporating and using one or more aspects of the following claimed subject matter. As one skilled in the art will appreciate, however, the depicted exemplary embodiment is only one representation of a variety of configurations in which one or more aspects of the claimed subject matter may be implemented.

Environment 10 includes a central processing unit (CPU) 12 which may execute portions of computer instructions or scripts. CPU 12 is connected to a mass storage device 14 such as a hard disk drive (HDD) or a similar component. CPU 12 is also connected to a memory 16 such as a non-volatile memory, for example, one or more EEPROMs (Electrically Erasable Programmable Read Only Memory), one or more flash PROMs (Programmable Read Only Memory), battery backup RAM, combinations thereof, and the like.

CPU 12 is coupled through a communication port 18 to a communication network 20 such as an Ethernet LAN (Local Area Network) or WAN (Wide Area Network). Communication network may include wireless components compatible with one or more wireless specifications, such as an IEEE 802.xx, WiMAX, or an equivalent standard. Finally, remote computer systems 22 and 24 are coupled to communication network 20. As one skilled in the art will appreciate, portions of computer programs, including the processes and scripts hereafter described, may execute on portions of environment 10, computer systems 22 and 24, or elsewhere. Portions of environment 10 may be used to evaluate various diagnostic algorithms according to the following described methodologies. For example, mass storage device 14 or memory 16 may store a particular dataset, which is processed by CPU 12 using a particular diagnostic algorithm.

The following approaches to evaluating diagnostic algorithms, including the depicted exemplary embodiments, may be said to be based on two criteria: non-recurring engineering costs, and recurring engineering costs. Cost metrics may be defined which correspond to each of these two criteria. Development data may be a large cost element and may be directly mapped to non recurring engineering costs. Cost metrics may be defined that measure how well a selected algorithm has used the development data. Tunable parameters correspond to the engineering time of tuning the algorithm once deployed and hence can be seen as recurring engineering costs. Cost metrics may be defined that measure how sensitive a selected algorithm is for the chosen tunable parameters. These cost metrics may be measured with respect to the algorithm's robustness and thereby reflect costs associated with sustaining the selected algorithm. The exemplary embodiments described below illustrate various procedures for calculating these metrics, making minimal assumptions regarding algorithm internals. These embodiments allow a user to evaluate both in-house as well as third party algorithms.

As will be further described, performance parameters may be employed to provide an indication of how well a particular diagnostic algorithm performs on a development or validation data set. Using these performance parameters, the sensitivity or robustness of the algorithm with respect to the data and threshold/tunable parameters may be defined and obtained. This sensitivity value may be referred to as a sensitivity parameter or metric. Throughout the following description, nomenclature describing the sensitivity of the performance of the diagnostic algorithm to changes in data is referred to as "data sensitivity." In other words, the data sensitivity describes the relative change in performance with respect to changes in data. Nomenclature describing changes in threshold/tunable parameters is referred to as "threshold sensitivity." The threshold sensitivity then, describes the relative change in performance with respect to changes in the parameters.

The following methodologies may be applicable to many learning or pattern classification algorithms. By application of the following methodologies on a pool of learning algorithms, it is possible to rank order the algorithms with respect to a pre-specified criterion. In this manner, for example, algorithms that are poor performers may be weeded out.

As a preliminary matter, a number of technical assumptions may be made in order to broaden the applicability of the following exemplary embodiments to various situations. A diagnostic algorithm may be assumed to be a triplet (A, D, T) where A is any data driven learning algorithm chosen/developed by the designer, D is the development or training data used by the designer and T is the thresholds or tunable parameters for the algorithm A. T may be chosen heuristically to suit A for D, obtained through an optimization procedure, or both. Algorithm, A, which is data driven, may be a simple pattern classification algorithm or a complex mixture.

In many diagnostic applications, Percentage of Misclassification (PMC) metrics, True Positive Rate metrics and False Positive Rate metrics are commonly used. These metrics, for example, may be useful for a fault detection case having two classes (a binary classification problem). In a general scenario having multiple faults, a confusion matrix is commonly used. However, it may be difficult to compare the performance of algorithms using confusion matrices. Receiver Operating Characteristic (ROC) curves and associated variants are also widely used to demonstrate comparison of various algorithms, but when dealing with multiclass classification problems and algorithms that depend on more than one threshold/tunable parameters, ROC curves may result in gross and inaccurate approximations.

In light of the foregoing, it is useful to define a summary parameter representative of the confusion matrix. Accordingly, a representative metric referred to throughout the following description as a Normalized Product Entropy Ratio (NPER) may be defined. Consider a multiclass classification problem with a total of M classes. Let the Confusion Matrix (CM) be such that the element CM(i, j) gives the percentage of test/cross-validation data, actually belonging to class i being judged by the FDD Algorithm as class j; $1 \leq i, j \leq M$. To define the Normalized Product Entropy Ratio, the following definitions of True Positive Rate (TPR), True Negative Rate (TNR), Positive Predictive Value (PPV) and Negative Predictive Value (NPV) are required:

$$TPR(X) = Pr(X = \text{specific class given by the algorithm, given that that class is the TRUTH}) \quad (1)$$

$$TNR(X) = 1 - Pr(X = \text{specific class given by the algorithm, given that the class is NOT the TRUTH}) \quad (2)$$

$$PPV(X) = Pr(X = \text{the class is the TRUTH, given that the classifier selects that particular class}) \quad (3)$$

$$NPV(X) = 1 - Pr(X = \text{the class is the TRUTH, given the classifier does not select that particular class}) \quad (4),$$

where X is the class of interest and $X \in \{1, 2, \ldots, M\}$.

Let ProductRate(X) for class X be defined as $$ProductRate(\text{at } X = A) = \begin{cases} \min\{TPR(A), TNR(A), PPV(A), NPV(A)\} & \text{f each of the parameters are above the } ProductRateThreshold \\ 0 & \text{otherwise.} \end{cases} \quad (5)$$

Let Normalized Product Rate (NPR) for class X be defined as $$NormalizedProductRate(\text{at } X = A) = \begin{cases} \dfrac{ProductRate(\text{at } X = A)}{\sum_X ProductRate(X)} & \text{if } \sum_X ProductRate(X) > 0 \\ 0 & \text{otherwise.} \end{cases} \quad (6)$$

Let Normalized Product Entropy (NPE) be defined as $$NormalizedProductEntropy = \sum_{X} NPR(X) * \log(NPR(X)^{-1}). \quad (7)$$

Finally, let Normalized Product Entropy Ratio (NPER) be defined as $$\text{Normalized ProductEntropyRatio} = NPE/\log(M) \quad (8).$$

Note that for a golden classifier NPER is 1.

The significance of and the information provided by NPER is highly dependent on how the ProductRate function itself is defined, and what the lower bounds for each of the variables TPR, TNR, PPV and NPV are. These lower bounds could also be different for each class. Accordingly, equal weight may be given to all classes while the same value may be used as the lower bound for all variables across all classes, or, depending upon the application, the lower bounds may be customizable for each variable and each class.

The ProductRate function may also be viewed as a filter which checks if the algorithm is meeting minimal requirements of the application. The NormalizedProductRate function normalizes ProductRate across the classes, so as to be able to measure the equiprobableness, or NormalizedProductEntropy, which indicates if the algorithm is able to isolate each of the classes in addition to meeting the application requirements. Finally NPER may be scaled to remain in [0, 1]. To be able to define sensitivity parameters, the performance parameter vector P may be fixed to be [PMC, NPER].

Based on the above performance parameters vector P, the sensitivity of (A,D,T) with respect to the thresholds and with respect to the noise (Gaussian) added to the data, a threshold sensitivity parameter and a data sensitivity parameter may be defined.

Let A be the diagnostic algorithm and T be the threshold parameters. Let $P_A(D,T)$ denote the performance parameters vector obtained with data D, threshold T and algorithm A. Let $T_0$ be the vector of original threshold parameters and $T_1$ be the vector of perturbed threshold parameters (assuming each of the components is perturbed randomly by at most a fraction, f), then the sensitivity of the learning algorithm A with respect to the thresholds, the threshold sensitivity parameter, is defined as $$\text{Threshold Sensitivity} = \frac{\Delta P_A}{\Delta_T}, \quad (9)$$

where $\Delta P_A$ is the norm of difference of the performance vectors and $\Delta_T$ is the norm of the difference of the original and perturbed threshold vectors. The metric is used to determine a smoothness of the function in the neighborhood of $T_0$. Ideally, the threshold parameters should be chosen from a plateau or a broad-based trough or valley. In addition, choice of the threshold parameters relates to the generalization capability of a particular diagnostic algorithm.

The data sensitivity parameter is analyzed by introducing noise based on a predetermined scale, i.e., for each variable the scale is determined from the data and a certain percentage of this range is added as noise for the corresponding variable. The scale may be determined based on a measurement range of sensors. For example, suppose k percent of scale is added as noise for each variable. Then $$DataSensitivity = \frac{\Delta P_A}{k * 0.01}, \quad (10)$$

where $\Delta P_A$ is the norm of the difference of the performance parameter vectors and k is the percentage of noise added based on scale. The metric is utilized to determine if the function remains in a band (cylinder) after slightly perturbing the data. In one embodiment, several Monte Carlo trials may be performed and the maximum (worst case) values are taken as the estimates for both threshold sensitivity and data sensitivity, as discontinuity of the function in any direction may not be acceptable.

To perturb the thresholds, let T be defined as the vector with components corresponding to the various threshold parameters of the diagnostic algorithm (threshold parameter vector). Let f be defined as an approximate fraction of perturbation to be induced to obtain T'. Let $t_i$ be the $i^{th}$ component of T, $t'_i$ the $i^{th}$ component of T' given by $t'_i = t_i*(1-f) + t_i*f*2*r$ where r is a random number between 0 and 1. Note, that $t'_i$ is a random number between $t_i*(1-f)$ and $t_i*(1+f)$ and this is the reason why f is the approximate fraction.

To perturb the data, let D be the data matrix to be perturbed by adding uniform random noise based on scale of k %. For each variable of D the range is determined. Let k % of range be nf (noise fraction). For each instance of this variable in D, a random number between [−nf, +nf] is added. This is repeated for all the variables to obtain a perturbed data matrix.

Figure 2:
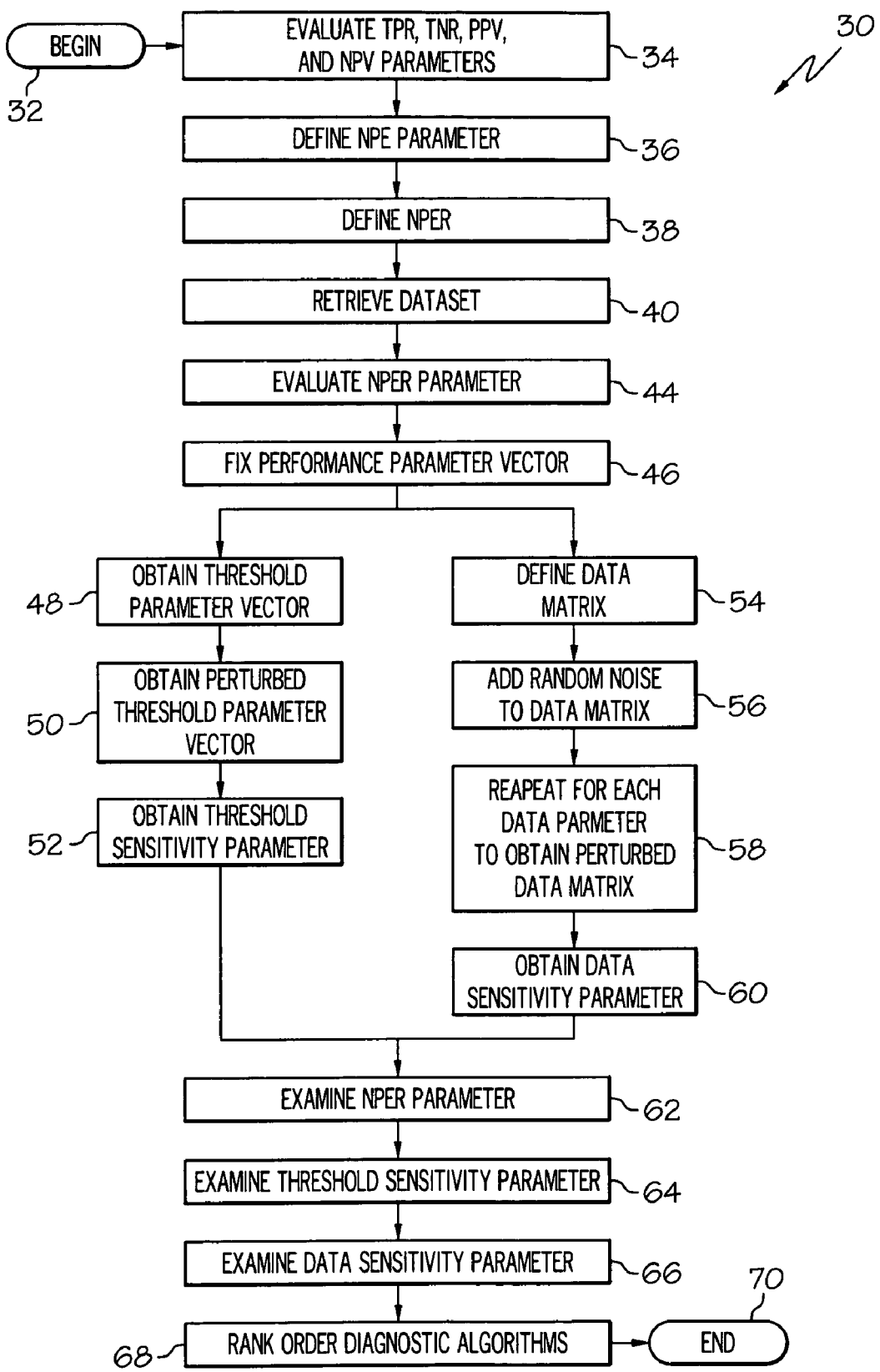
FIG. 2 illustrates an exemplary method for benchmarking diagnostic algorithms.

Turning to FIG. 2, an exemplary method 30 for evaluating diagnostic algorithms according to the foregoing description is shown. Method 30 illustrates a sequential approach for evaluating various vector representations of a diagnostic algorithm, as well as representative parameters of various functions described above. As noted previously, various portions of method 30 may be implemented by a computer or computer system, or by a processor configured as such. Further, various portions of method 30 may take the form of computer instructions and embodied in computer program products.

Method 30 begins (step 32) by evaluating the confusing matrix (CM) based on the diagnostic algorithm, from which are evaluated the TPR, TNR, PPV, and NPV variables (step 34). An NPE parameter is then defined (step 36). From the NPE parameter, the NPER is defined (step 38).

In the depicted embodiment, once the NPER is evaluated using the NPE parameter (step 44), the performance parameter vector(s) are then accordingly fixed (step 46).

A threshold parameter vector is defined (step 48). A perturbed threshold parameter vector is defined and obtained by perturbing the thresholds (step 50). A threshold sensitivity parameter is then obtained (step 52).

Coincidentally with the threshold analysis described above, a data matrix is defined (step 54). Random noise is added to the data matrix (step 56) according to a predetermined scale. The noise is added to each instance of a variable in the data matrix to obtain a perturbed data matrix (step 58). The data matrix and perturbed data matrix parameters are used to obtain a data sensitivity parameter (step 60).

Once the threshold sensitivity parameter and data sensitivity parameter is obtained for each classifier, an analysis of the various parameters (metrics) may take place. The NPER parameter is examined (step 62), as well as the threshold sensitivity parameter (step 64) and the data sensitivity parameter (step 66) for a particular classifier. From this analysis, the algorithms may be rank ordered with respect to a pre-specified criterion (step 68). Poor performing algorithms may, for example, be discarded from further consideration. Method 30 then ends (step 70).

Consider the following two examples of various applications of method 30 using real world datasets. In the following examples, it is assumed that each diagnostic algorithm provides an interface to an associated training algorithm and an associated testing algorithm. It is also assumed that the internals of the algorithm need not be available. Finally, the test algorithm is assumed to provide a posterior probability estimates for each of the classes.

The first example utilizes a dataset consisting of Indian Telugu Vowel linguistic data. The second example utilizes gas turbine engine data for an aircraft. The Indian Telugu Vowel dataset constitutes three formant frequencies as features and 6 overlapping vowel classes with complex decision boundaries, consisting of a total of 871 patterns. The gas turbine engine data is a snapshot data. The gas turbine engine data consists of seven features corresponding to Fan Speed (N1), High Pressure Shaft speed percentage (N2), corrected Exhaust Gas Temperature (EGT) and corrected fuel flow (WF) etc. The corrected values are obtained by using a polynomial model as a data-preprocessing step. The data comprises 4 classes, one of which corresponds to nominal and the other three correspond to faults (HP turbine deterioration, bleed band leakage, abrupt EGT sensor failure). There are a total of 6770 patterns.

Various pattern classification algorithms are considered, namely the Maximum Likelihood Classifier with Gaussian distributions (MLCG), Linear Principal Component Analysis based classifier (LPCA), Non Parameteric Bayesian Classifier (NPBC), k-Nearest Neighbor Classifier, and Support Vector Machine with Guassian Kernel (SVMG) for classification/diagnosis. For the outputs of each classifier, a softmax transformation is applied to obtain a posterior probability estimates. In each of the examples, several Monte Carlo simulations are performed. In each simulation, a five fold cross validation estimate of performance and sensitivity parameters is obtained. To select a best algorithm, a Fuzzy Min-Max criterion is used.

The results of the linguistics dataset analysis are shown in FIG. 3 by table 72. Thresholds for ProductRate are chosen to be 0.65 and the parameters chosen for each of the classifiers are (1) LPCA retains 98% variance and minimum reconstruction errors are used to get the posterior probabilites for each of the classes, (2) NPBC uses a band width of 3, SVM uses Gaussian kernel with C=1.5 and s=2.5, (3) k-NN-3 uses k=3, (4) and k-NN-5 uses k=5. Fuzzy Min-Max criterion analysis selects k-NN-5 to be the best diagnostic algorithm in this case.

The results of the gas turbine dataset analysis are shown in FIG. 4 by table 74. For this dataset, while an ideal choice of thresholds for ProductRate may be approximately 0.95, a less stringent value of 0.85 is chosen to make the illustration clear and the parameters for each of the classifiers (1) LPCA retains 98% variance and minimum reconstruction errors are used to get the posterior probabilites for each of the classes, (2) NPBC uses a band width of 5, (3) k-NN-3 uses k=3, and (4) k-NN-10 uses k=10. Fuzzy Min-Max criterion analysis selects Maximum Likelihood Classifier with Gaussian distributions (MLCG) as the best diagnostic algorithm in this case.

The above description provides a generic framework for performing sensitivity analysis on the performance parameters of a diagnostic algorithm with respect to tunable parameters and development data, also associating these sensitivity metrics to recurring engineering cost and non-recurring engineering costs, respectively. Once the aforesaid analysis has been performed, zeroing in on a particular diagnostic algorithm may be thought of as a Multiobjective Optimization Problem (MOP) that attempts to simultaneously optimize a number of conflicting objectives: minimization of PMC, Threshold Sensitivity and Data Sensitivity; and maximization of NPER.

Figure 5:
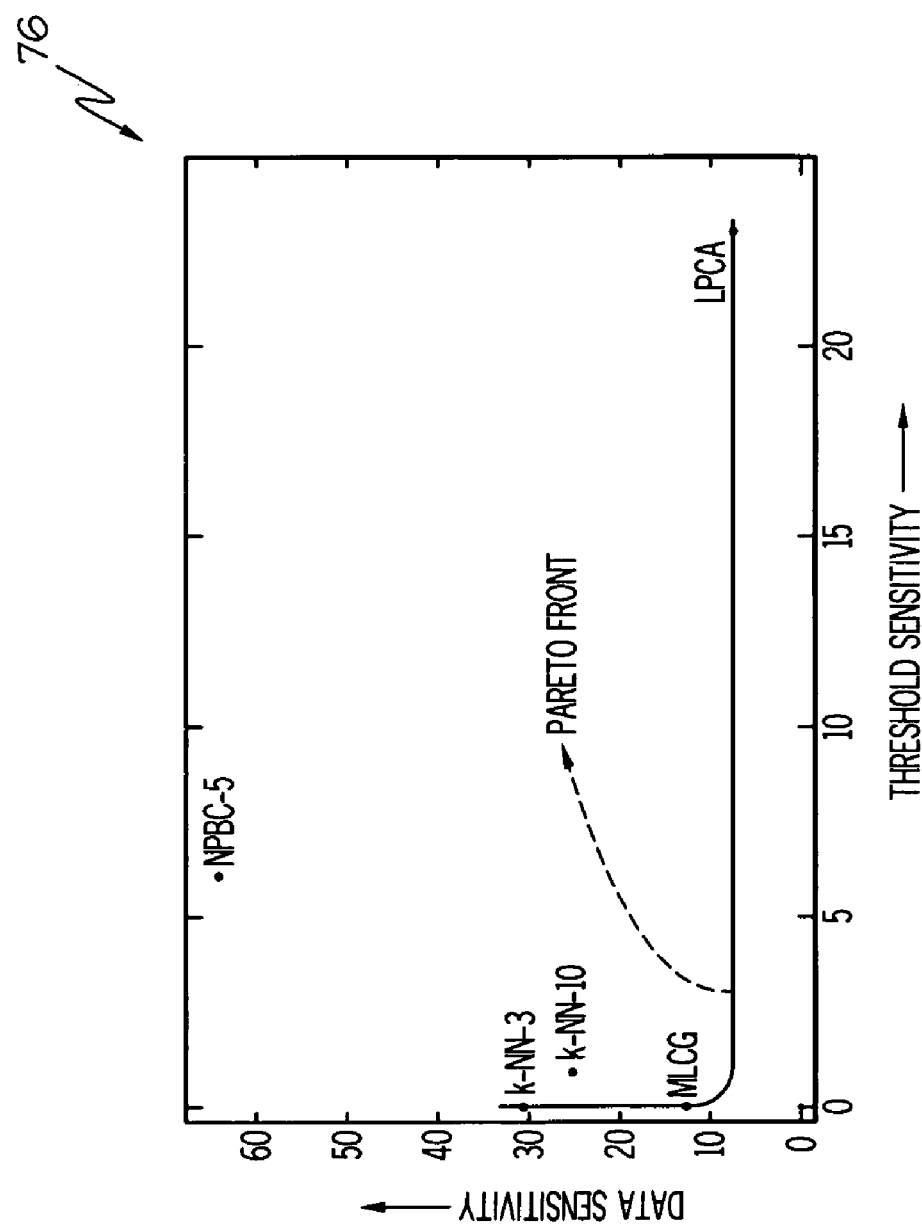
FIG. 5 illustrates an exemplary Pareto front of various algorithms for a gas turbine engine dataset.

These metrics help the user to exit the technical feasibility stage gate by filtering out weak diagnostic algorithm(s) and take forward the better ones for engineering feasibility on the technology readiness level. Turning to FIG. 5, a plot 76 of various algorithms, taking threshold sensitivity on the X-axis and data sensitivity on the Y-axis, is shown. The thick curve passing through the points labeled k-NN-3, MLCG and LPCA represent non-dominating points in the Pareto optimal set (Pareto front). Each of the algorithms above this curve can be filtered out or eliminated.

Once deployed, a particular diagnostic algorithm is usually expected to continue performing its task. However, it may be useful to implement a monitoring mechanism to report any degradation of performance, particularly in light of the time to retrain or replace the algorithm. The methodologies described above may be used as benchmarking tools for signaling a time to retrain or replace a particular diagnostic algorithm.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for benchmarking a plurality of diagnostic algorithms for a particular application, comprising:
   in a processor:
   defining a true positive rate (TPR), a true negative rate (TNR), a positive predictive value (PPV) and a negative predictive value (NPV) parameter;
   defining a normalized product entropy (NPE) parameter;
   defining a normalized product entropy ratio (NPER) from the NPE parameter;
   evaluating the NPER;

fixing a performance parameter vector to define a plurality of sensitivity parameters including a plurality of threshold parameters and a plurality of data parameters; and perturbing the plurality of threshold parameters and the plurality of data parameters to obtain a threshold sensitivity parameter and a data sensitivity parameter.

2. The method of claim 1, further including analyzing the product entropy ratio parameter, the threshold sensitivity parameter, and the data sensitivity parameter for each of the plurality of diagnostic algorithms to rank order the plurality of diagnostic algorithms.

3. The method of claim 1, wherein perturbing the plurality of threshold parameters includes obtaining a threshold parameter vector representative of the plurality of threshold parameters, and obtaining a perturbed threshold parameter vector representative of a plurality of perturbed threshold parameters.

4. The method of claim 1, wherein perturbing the plurality of data parameters includes:
(1) defining a data matrix,
(2) adding random noise to the data matrix based on a predetermined scale, and
(3) repeating steps (1) and (2) for each of the plurality of data parameters to obtain a perturbed data matrix.

5. A computer system for benchmarking a plurality of diagnostic algorithms for a particular application, comprising:
a storage device for storing and retrieving the dataset; and
a processor coupled to the storage device, wherein the processor is configured for:
defining a true positive rate (TPR), a true negative rate (TNR), a positive predictive value (PPV) and a negative predictive value (NPV) parameter,
obtaining a normalized product entropy ratio parameter,
fixing a performance parameter vector to define a plurality of sensitivity parameters including a plurality of threshold parameters and a plurality of data parameters, and
perturbing the plurality of threshold parameters and the plurality of data parameters to obtain a threshold sensitivity parameter and a data sensitivity parameter.

6. The computer system of claim 5, wherein the processor is further configured for analyzing the product entropy ratio parameter, the threshold sensitivity parameter, and the data sensitivity parameter for each of the plurality of diagnostic algorithms to rank order the plurality of diagnostic algorithms.

7. The computer system of claim 5, wherein the processor is further configured for evaluating a normalized product entropy ratio (NPER).

8. The computer system of claim 5, wherein the processor is further configured for defining a normalized product entropy (NPE) parameter.

9. The computer system of claim 5, wherein the processor is further configured for obtaining a threshold parameter vector representative of the plurality of threshold parameters, and obtaining a perturbed threshold parameter vector representative of a plurality of perturbed threshold parameters.

10. The computer system of claim 5, wherein the processor is further configured for: (1) defining a data matrix,
(2) adding random noise to the data matrix based on a predetermined scale, and
(3) repeating steps (1) and (2) for each of the plurality of data parameters to obtain a perturbed data matrix.

11. A computer program product for benchmarking a plurality of diagnostic algorithms for a particular application, the computer program product comprising a non-transitory computer-readable storage medium having computer-readable program code portions stored therein for causing a computer processor to perform a process, the computer-readable program code portions comprising:
a first executable portion configured for obtaining a normalized product entropy ratio parameter;
a second executable portion configured for fixing a performance parameter vector to define a plurality of sensitivity parameters including a plurality of threshold parameters and a plurality of data parameters;
a third executable portion configured for perturbing the plurality of threshold parameters and the plurality of data parameters to obtain a threshold sensitivity parameter and a data sensitivity parameter; and
a fourth executable portion for obtaining a threshold parameter vector representative of the plurality of threshold parameters, and obtaining a perturbed threshold parameter vector representative of a plurality of perturbed threshold parameters,
wherein the threshold sensitivity parameter is defined as:

$$T_S = \frac{\Delta P_A}{\Delta_T},$$

where $T_S$ is the threshold sensitivity parameter, $\Delta P_A$ is a norm of a difference of the performance parameter vector, and $\Delta_T$ is the norm of a difference of the threshold parameter vector and perturbed threshold parameter vectors.

12. The computer program product of claim 11, further including a fifth executable portion for analyzing the product entropy ratio parameter, the threshold sensitivity parameter, and the data sensitivity parameter for each of the plurality of diagnostic algorithms to rank order the plurality of diagnostic algorithms.

13. The computer program product of claim 11, further including a fifth executable portion for evaluating a normalized product entropy ratio (NPER).

14. The computer program product of claim 13, further including a sixth executable portion for defining a normalized product entropy (NPE) parameter.

15. The computer program product of claim 14, wherein the normalized product entropy ratio is defined as $$NPER = \frac{NPE}{\log(M)},$$

where NPER is the normalized product entropy ratio, NPE is the normalized product entropy parameter, and M is a number of classes.

16. The computer program product of claim 11, further including a fifth executable portion for determining a true positive rate (TPR), a true negative rate (TNR), a positive predictive value (PPV) and a negative predictive value (NPV) parameter.

17. The computer program product of claim 11, further including a fifth executable portion for:
(1) defining a data matrix,
(2) adding random noise to the data matrix based on a predetermined scale, and
(3) repeating steps (1) and (2) for each of the plurality of data parameters to obtain a perturbed data matrix.

18. The computer program product of claim 17, wherein the data sensitivity parameter is defined as $$D_S = \frac{\Delta P_A}{k * 0.01},$$

where $D_S$ is the data sensitivity parameter, $\Delta P_A$ is a norm of a difference of the performance parameter vector, and k is a percentage of the random noise added to the data matrix based on the predetermined scale.

* * * * *